United States Patent
Qian

(10) Patent No.: US 10,101,225 B2
(45) Date of Patent: Oct. 16, 2018

(54) PRESSURE SENSOR WITH LIGHT DETECTION OF DIAPHRAGM PROTRUSION

(71) Applicant: CSMC TECHNOLOGIES FAB1 CO., LTD., Wuxi New District (CN)

(72) Inventor: Dongbiao Qian, Wuxi (CN)

(73) Assignee: CSMC TECHNOLOGIES FAB1 CO., LTD., Wuxi New District (CN)

( * ) Notice: Subject to any disclaimer, the term of this patent is extended or adjusted under 35 U.S.C. 154(b) by 0 days.

(21) Appl. No.: 15/119,311

(22) PCT Filed: May 6, 2015

(86) PCT No.: PCT/CN2015/078355
§ 371 (c)(1),
(2) Date: Aug. 16, 2016

(87) PCT Pub. No.: WO2015/169217
PCT Pub. Date: Nov. 12, 2015

(65) Prior Publication Data
US 2017/0010164 A1      Jan. 12, 2017

(30) Foreign Application Priority Data

May 6, 2014   (CN) .......................... 2014 1 01889501

(51) Int. Cl.
*G01L 1/24*     (2006.01)
*G01L 1/04*     (2006.01)

(52) U.S. Cl.
CPC ................ *G01L 1/242* (2013.01); *G01L 1/04* (2013.01)

(58) Field of Classification Search
CPC .................................. G01L 1/242; G01L 1/04
See application file for complete search history.

(56) References Cited

U.S. PATENT DOCUMENTS 4,543,831 A     10/1985  Meyer
4,932,263 A *    6/1990  Wlodarczyk ......... G01L 9/0076
                                                       250/227.23

(Continued)

FOREIGN PATENT DOCUMENTS

CN     1143184 A     2/1997
CN     1149931 A     5/1997

(Continued)

OTHER PUBLICATIONS

First Office Action (and English Translation thereof) and related Search Report for Chinese Application No. 201410188950.1, dated Feb. 23, 2017 (12 pages).

(Continued)

*Primary Examiner* — Lisa Caputo
*Assistant Examiner* — Nathaniel T Woodward
(74) *Attorney, Agent, or Firm* — Kagan Binder, PLLC

(57) ABSTRACT

Provided is a pressure sensor that includes a detection film that is arranged on a silicon substrate, detects a pressure applied to a surface thereof, and generates a protrusion deformation in response to the pressure. The pressure sensor also includes an optical transmitter and an optical detector that are arranged on the silicon substrate on opposite sides of the detection film and are located at a plane parallel to a plane comprising the detection film. The pressure sensor also includes a pressure calculation module that is connected to the optical detector and is used for acquiring light intensity data and calculating a pressure value according to the light intensity data. Also provided is a method of manufacturing the pressure sensor.

13 Claims, 4 Drawing Sheets

(56) References Cited

U.S. PATENT DOCUMENTS

| | | | |
|---|---|---|---|
| 6,105,436 A | 8/2000 | Lischer et al. | |
| 2008/0224029 A1* | 9/2008 | Kaiser | G01L 1/24 250/231.19 |

FOREIGN PATENT DOCUMENTS

| | | | | |
|---|---|---|---|---|
| CN | 2475015 | Y | | 1/2002 |
| CN | 2537970 | Y | | 2/2003 |
| CN | 1432801 | A | | 7/2003 |
| CN | 1571183 | A | | 1/2005 |
| CN | 101223427 | A | | 7/2008 |
| CN | 101289160 | A | | 10/2008 |
| CN | 101398336 | A | | 4/2009 |
| CN | 101730838 | A | | 6/2010 |
| CN | 102243126 | A | | 11/2011 |
| EP | 1744135 | A1 | | 1/2007 |
| GB | 2329243 | A | * | 3/1999 ........... A43B 3/0005 |

OTHER PUBLICATIONS

Second Office Action (and English Translation thereof) for Chinese Application No. 201410188950.1, dated Aug. 18, 2017 (13 pages).
Extended European Search Report for European Application No. 15788897.5 dated Aug. 9, 2017 (9 pages).
English Translation of International Search Report for International Application No. PCT/CN2015/078355, dated Jul. 7, 2015 (3 pages).
Office Action for Chinese Patent Application No. 201410188950.1, dated Dec. 13, 2017, 18 pages (8 pages of Official Office Action, 10 pages of English translation).

* cited by examiner

PRESSURE SENSOR WITH LIGHT DETECTION OF DIAPHRAGM PROTRUSION

FIELD OF THE INVENTION

The invention relates to a technical field of sensors, and more particularly relates to a pressure sensor and a manufacturing method of the pressure sensor.

BACKGROUND OF THE INVENTION

The conventional piezo-resistive MEMS pressure sensor takes advantage of the piezo-resistive characteristic of silicon material to fabricate the four-bridge arm resistance of wheatstone bridge. It detects the pressure by virtue of the voltage change caused by the resistance change which is generated by pressure. However, the piezo-resistive material is naturally susceptible to the change of external temperature, the temperature drift characteristic is poor. In the complicated electromagnetic environment, the circuit mode adopting the wheatstone bridge is vulnerable to interference, thus leading to a non-accuracy pressure detection.

SUMMARY OF THE INVENTION

Accordingly, it is necessary to provide a pressure sensor which can effectively address problems of temperature drift and electromagnetism of the piezo-resistive pressure sensor.

A pressure sensor includes: a detecting diaphragm positioned on a silicon substrate, to detect a pressure applied to a surface of the detecting diaphragm and to generate a protrusion deformation in response to the pressure; a light emitter and a light detector both positioned on the silicon substrate and located at a plane parallel to a plane located by the detecting diaphragm, and the light emitter and the light detector being positioned on opposite sides of the detecting diaphragm; and a pressure calculating module connected to the light detector and configured to acquire a light intensity data and to calculate a pressure value according to the light intensity data.

A method of manufacturing a pressure sensor includes: providing a silicon substrate; etching a region of the silicon substrate which is used to form a detecting diaphragm to obtain the detecting diaphragm having a predetermined thickness; and positioning a light emitter and a light detector on the silicon substrate, wherein the light emitter and the light detector are located at a plane parallel to a plane located by the detecting diaphragm, and the light emitter and the light detector are positioned on opposite sides of the detecting diaphragm.

The pressure sensor as mentioned adopts an optical method to transfer a deformation value of the detecting diaphragm into a light intensity, and employs the light detector to transfer the light intensity to an electrical signal and obtains the pressure by virtue of performing a calculation, thus effectively addressing issues of a temperature drift characteristic and an electromagnetic interference of the piezo-resistance pressure sensor itself.

DETAILED DESCRIPTION OF THE EMBODIMENTS

Figure 1:
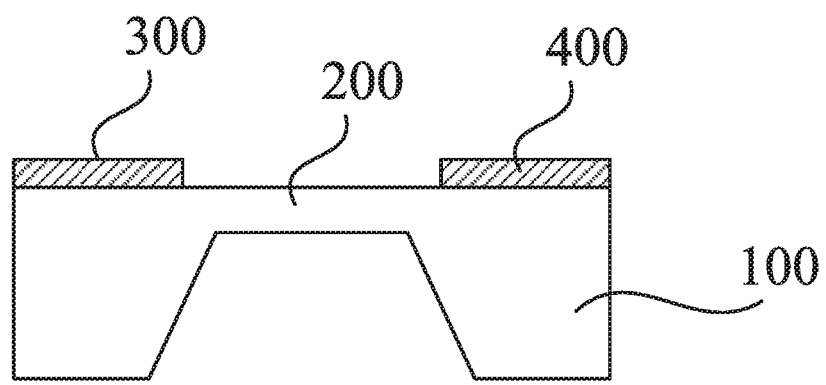
FIG. 1 is a side view of a pressure sensor according to an embodiment.

As shown in FIG. 1, a pressure sensor 10 according to one embodiment includes a detecting diaphragm 200, a light emitter 300, and a light detector 400.

Figure 2:
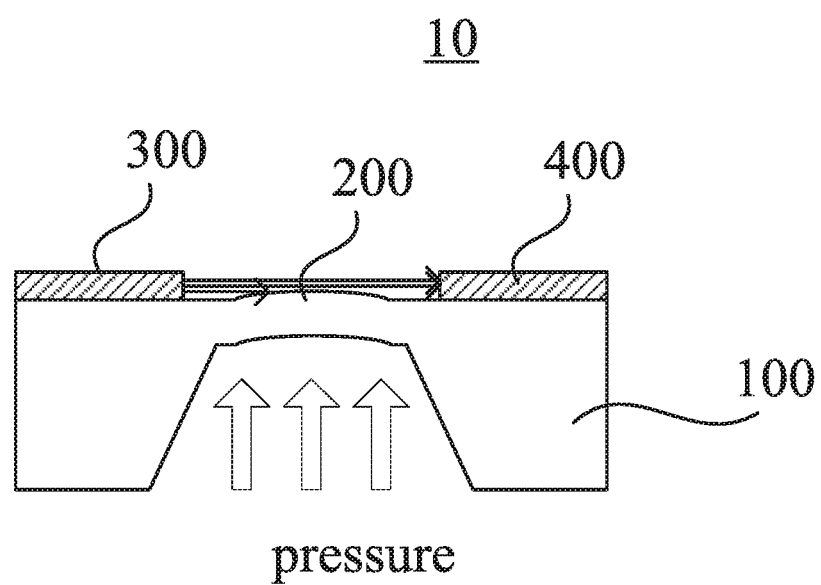
FIG. 2 is a schematic view of a pressure sensor illustrating an operation principle.

Referring to FIG. 2, the detecting diaphragm 200 is configured to detect a pressure applied to a surface of the detecting diaphragm 200 and generates a protrusion deformation in response to the pressure. Generally, a selection of the material forming the detecting diaphragm and a size of the detecting diaphragm enable the size of the pressure to be proportional to a protruding value of the detecting diaphragm 200. In the illustrated embodiment, the detecting diaphragm 200 is a silicon structure which is integrally formed with the silicon substrate 100. A thickness of the detecting diaphragm 200 is designed to be 5 microns to 100 microns according to a greater pressure value. The protruding value of the detecting diaphragm 200 is equal to or less than 30 microns.

Figure 3:
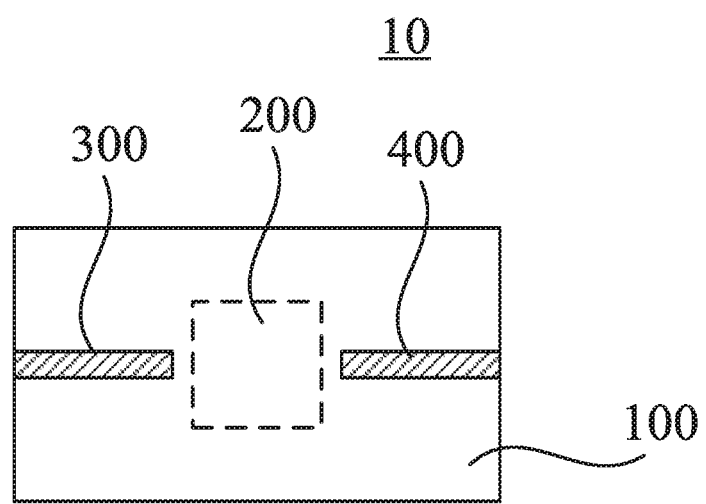
FIG. 3 is a top view of a pressure sensor of FIG: 1.

Referring to FIG. 3, the light emitter 300 and the light detector 400 are positioned on the silicon substrate 100, and located at a plane parallel to the plane located by the detecting diaphragm 200. The light emitter 300 and the light detector 400 are positioned on opposite sides of the detecting diaphragm 200 correspondingly. The light emitter 300 and the light detector 400 are adapted to each other. The light emitter 300 can emit visible light or non-visible light. Accordingly, the light detector 400 can detect the visible light or the non-visible light. For an example, the light emitter 300 and the light detector 400 are an infrared light emitter and an infrared light detector respectively.

A diameter of a light beam emitted by the light emitter 300 is greater than the greatest protruding value of the detecting diaphragm 200, and generally, it is not more than 10 times of the greatest protruding value. In one embodiment, the diameter of the light beam emitted by the light emitter 300 ranges from 30 microns to 60 microns. Therefore, the detecting diaphragm 200 changes from a shape of fully flat to a shape of completely raised, a shielding value of the light falls into a greater variant ranges, thus the pressure has a greater distinction degree.

In one embodiment, an optical fiber of an emitting end of the light emitter 300 and an optical fiber of a receiving end of the light detector 400 are located on the plane on which the detecting diaphragm is positioned, and are positioned on opposite sides of the detecting diaphragm, such that an area of the silicon substrate 100 occupied is less.

The pressure sensor further includes a pressure calculating module (not shown). The pressure calculating module is connected to the light detector 400, and acquires a light intensity data and calculates a pressure value according to the light intensity data.

The pressure sensor as mentioned adopts an optical method to transfer a deformation value of the detecting diaphragm into a light intensity, and employs the light detector to transfer the light intensity to an electrical signal and obtains the pressure by virtue of performing a calculation, thus effectively addressing issues of a temperature drift characteristic and an electromagnetic interference of the piezo-resistance pressure sensor itself.

Figure 4:
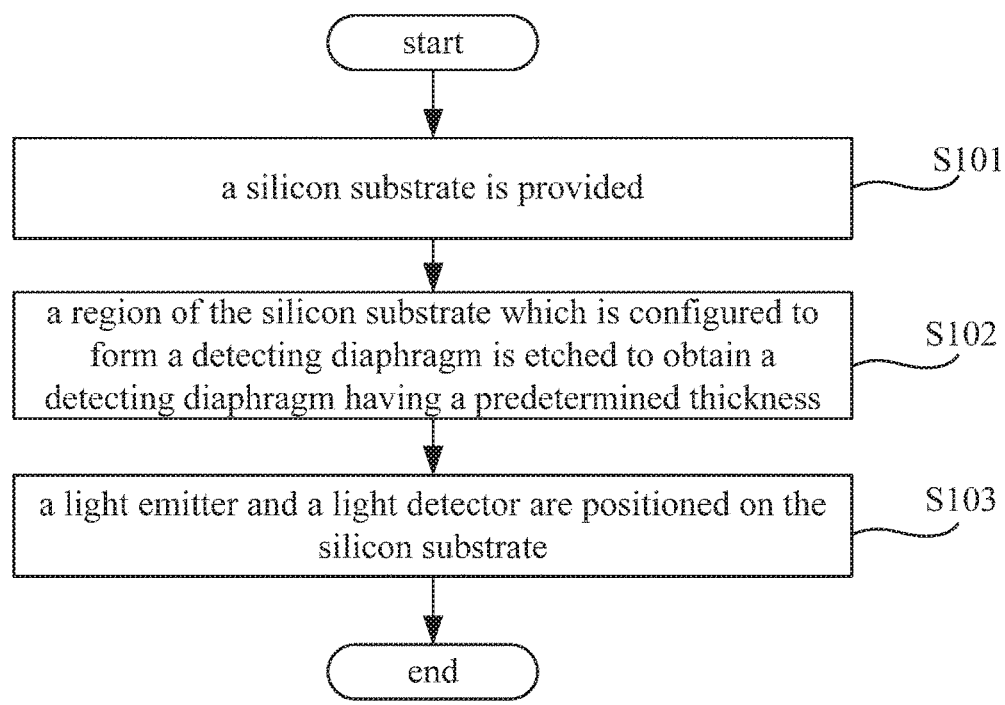
FIG. 4 is a flow chart of a method of manufacturing a pressure sensor according to an embodiment.

FIG. 4 is a flow chart of a method form manufacturing a pressure sensor according to an embodiment. The method include the following steps:

In step S101, a silicon substrate is provided.

In step S102, a region of the silicon substrate which is configured to form a detecting diaphragm is etched to obtain a detecting diaphragm having a predetermined thickness. Referring to FIG. 2, the detecting diaphragm 200 is configured to detect a pressure applied to a surface of the detecting diaphragm 200 and generates a protrusion deformation which is corresponding to the pressure in size. Generally, a selection of the material forming the detecting diaphragm and a size of the detecting diaphragm enable the size of the pressure to be proportional to a protruding value of the detecting diaphragm 200. In the embodiment, the detecting diaphragm 200 has a silicon structure which is integrally formed with the silicon substrate 100. A thickness of the detecting diaphragm 200 is designed to range from 5 microns to 100 microns according to a greater pressure value. The protruding value of the detecting diaphragm 200 is equal to or less than 30 microns.

In step S103, a light emitter 300 and a light detector 400 are positioned on the silicon substrate 100, and are located at a plane parallel to the plane located by the detecting diaphragm 200, and the light emitter 300 and the light detector 400 are positioned on opposite sides of the detecting diaphragm 200 correspondingly. The light emitter 300 and the light detector 400 are adapted to each other. The light emitter 300 can emit visible light or non-visible light. Accordingly, the light detector 400 can detect the visible light or the non-visible light. For example, the light emitter 300 and the light detector 400 are an infrared light emitter and an infrared light detector respectively A diameter of a light beam emitted by the light emitter 300 is greater than the greatest protruding value of the detecting diaphragm 200, and generally, it is not more than 10 times of the greatest protruding value. In one embodiment, the diameter alight beam emitted by the light emitter 300 ranges from 30 microns to 60 microns. Therefore, the detecting diaphragm 200 changes from a shape of fully flat to a shape of completely raised, a shielding value of the light falls into a greater variant ranges, thus the pressure has a greater distinction degree.

In step S103, specifically, an optical fiber of an emitting end of the light emitter 300 and an optical fiber of a receiving end of the light detector 400 are located on silicon substrate 100.

Above pressure adopts an optical method to transfer a deformation value of the detecting diaphragm to a light intensity, and employs the light detector to transfer the light intensity to an electrical signal and obtains the pressure by virtue of performing a calculation, effectively avoiding a temperature drift characteristic and an electromagnetic interference of the piezo-resistance pressure sensor.

The above are several embodiments of the present invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

What is claimed is:

1. A pressure sensor, comprising:
   a silicon substrate defining a base area having a first thickness, the silicon substrate including a detecting diaphragm defining a detecting diaphragm area having a second thickness,
   wherein the first thickness is greater than the second thickness, and
   wherein the detecting diaphragm is configured to detect a pressure applied to a surface of the detecting diaphragm and to generate a protrusion deformation in response to the pressure;
   a light emitter and a light detector positioned on the silicon substrate and located at a plane parallel to a plane comprising the detecting diaphragm, and the light emitter and the light detector being positioned on opposite sides of the detecting diaphragm to define a light path, wherein the detecting diaphragm is configured to protrude and intercept the light path; and
   a pressure calculating module connected to the light detector and configured to acquire a light intensity data and to calculate a pressure value according to the light intensity data,
   wherein a diameter of a light beam emitted by the light emitter is greater than a greatest protruding value of the detecting diaphragm in a protrusion direction of the detecting diaphragm.

2. The pressure sensor according to claim 1, wherein the detecting diaphragm is a silicon structure integrally formed with the silicon substrate.

3. The pressure sensor according to claim 1, wherein a thickness of the detecting diaphragm ranges from 5 microns to 100 microns.

4. The pressure sensor according to claim 1, wherein a protruding value of the detecting diaphragm is less than 30 microns.

5. The pressure sensor according to claim 4, wherein the diameter of the light beam emitted by the light emitter is equal to or less than 300 microns.

6. The pressure sensor according to claim 4, wherein the diameter of the light beam emitted by the light emitter ranges from 30 microns to 60 microns.

7. The pressure sensor according to claim 1, wherein an optical fiber of an emitting end of the light emitter and an optical fiber of a receiving end of the light detector are located on the plane parallel to the plane comprising the detecting diaphragm, and the optical fiber of the emitting end of the light emitter and the optical fiber of the receiving end of the light detector are positioned on opposite sides of the detecting diaphragm.

8. The pressure sensor according to claim 7, wherein the light emitter is an infrared light emitter and the light detector is an infrared light detector.

9. The pressure sensor according to claim 1, wherein a protruding value of the detecting diaphragm is proportional to the pressure.

10. A method of manufacturing a pressure sensor, comprising:
    providing a silicon substrate;
    etching a region of the silicon substrate which is used to form a detecting diaphragm having a predetermined thickness; and
    positioning a light emitter and a light detector on the silicon substrate, wherein the light emitter and the light detector are located at a plane parallel to a plane comprising the detecting diaphragm, and the light emitter and the light detector are positioned on opposite sides of the detecting diaphragm to define a light path, wherein the detecting diaphragm is configured to protrude and intercept the light path,
    wherein a diameter of a light beam emitted by the light emitter is greater than a greatest protruding value of the detecting diaphragm in a protrusion direction of the detecting diaphragm.

11. The method according to claim 10, wherein the positioning the light emitter and the light detector on the silicon substrate specific comprises: positioning an optical fiber of an emitting end of the light emitter and an optical fiber of a receiving end of the light detector on the silicon substrate.

12. The method according to claim 11, wherein the light emitter is an infrared light emitter and the light detector is an infrared light detector.

13. The method according to claim 10, wherein a protruding value of the detecting diaphragm is proportional to the pressure applying to the detecting diaphragm.

* * * * *